J. W. NICHOLS.
CAN CAP WITH VENT SHIELD.
APPLICATION FILED MAY 22, 1911.
1,141,973.
Patented June 8, 1915.
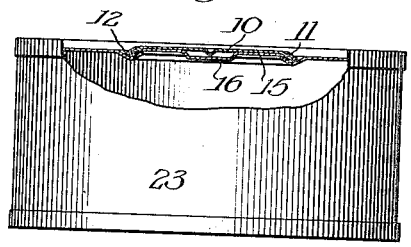
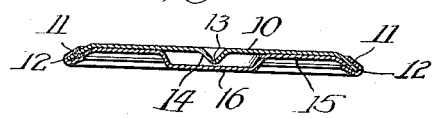
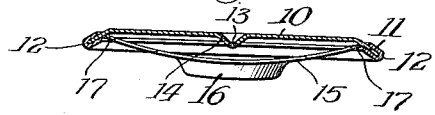
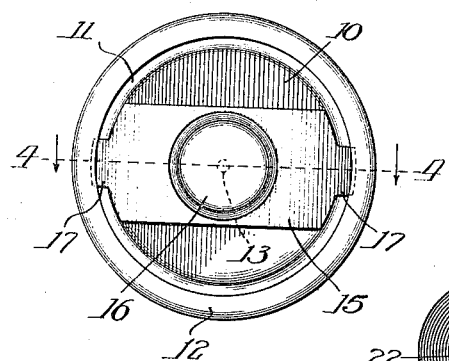
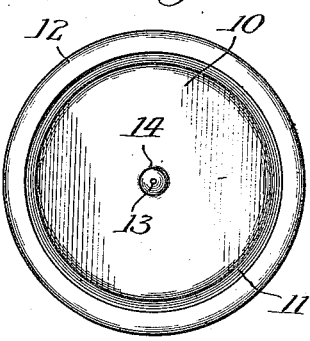
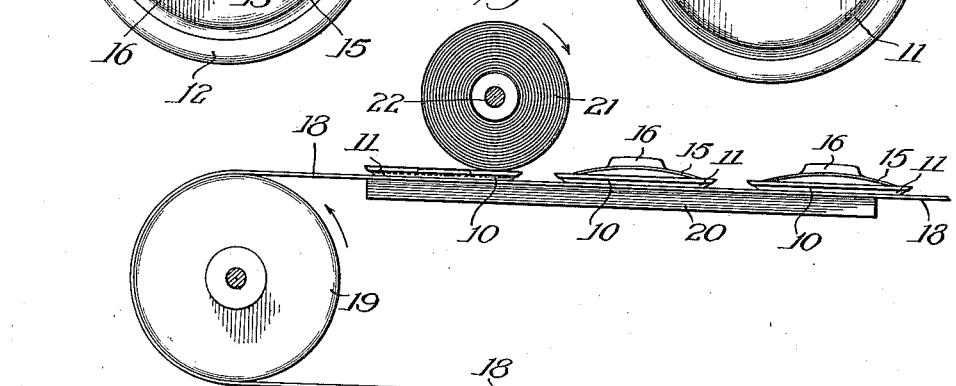
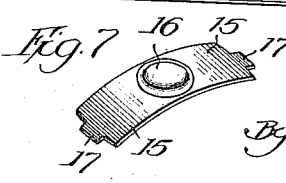
Witnesses:
Inventor
Jesse W. Nichols.

UNITED STATES PATENT OFFICE.

JESSE W. NICHOLS, OF CHICAGO, ILLINOIS.

CAN-CAP WITH VENT-SHIELD.

1,141,973.   Specification of Letters Patent.   Patented June 8, 1915.

Application filed May 22, 1911. Serial No. 628,845.

*To all whom it may concern:*

Be it known that I, JESSE W. NICHOLS, a citizen of the United States, residing at Chicago, in the county of Cook and State of Illinois, have invented certain new and useful Improvements in Can-Caps with Vent-Shields, of which the following is a specification.

My invention relates to caps used for closing cans in which vegetables, meat and the like are preserved, and refers particularly to the attachment to said cap of a shield for protecting the vent hole.

As is well known, after a can is filled with the material to be preserved a cap is applied, this cap being provided with a vent hole for the purpose of allowing the escape of the heated air or gases inside of the can. The final operation consists in closing the vent hole by means of solder or otherwise, thereby forming a partial vacuum inside of the can when the heated material therein becomes cool.

It has been customary to provide the cap with a vent shield, for the double purpose of preventing access of the material within the can to the vent, thus interfering with the soldering operation, and, second, in order to prevent the melted solder from flowing through the vent and thus entering the food within the can. This vent shield has ordinarily been attached to the inner surface of the cap by means of solder.

This operation is slow and expensive, and it is the object of my invention to quickly and efficiently attach the vent shield to the cap in such a manner that the necessity of making the connection by means of melted solder is entirely eliminated. I accomplish this result by first forming the vent shield preferably in the form of an arc or other shape so that on compression its length becomes increased. While in its bent condition the vent shield is applied to the cap, the cap and shield are then passed under a suitable roller, preferably by means of an endless belt, and the vent shield is thus flattened and elongated so that its ends are caught under a suitable portion of the cap, this portion preferably consisting of a ring of solder which incloses the edge of the cap and is subsequently used for attaching the cap to the can. It will be evident that by this simple method of applying the vent shields a large number of caps may be quickly and economically equipped. These and other advantages of my invention will be more apparent by reference to the accompanying drawings, which represent a preferred embodiment of my improvements, and in which—

Figure 1 is a side elevation of a can, the upper portion of which is broken away in order to show the cap and vent shield in section; Fig. 2 is a bottom plan view of the cap before the vent shield is applied; Fig. 3 is a view similar to Fig. 2 but showing the vent shield in position; Fig. 4 is a vertical section taken on the line 4—4 of Fig. 3; Fig. 5 is a vertical section similar to Fig. 4, except that the vent shield has not been flattened and elongated into the position in which it is shown in Figs. 3 and 4; Fig. 6 is a diagrammatic elevation of the apparatus used for fastening the vent shield to the cap, and Fig. 7 is a perspective of the vent shield before it has been flattened.

The cap 10 is provided with the obliquely-disposed edge 11, which is inclosed by the U-shaped strip of solder 12. The vent hole 13 is placed in the apex of the downwardly projecting cone 14 at the center of the cap 10.

The vent shield 15 is preferably made of metal which is annealed dead soft, and in its central portion is provided with the cup-shaped depression 16. At each end is a tongue 17, preferably of less width than that of the main portion of the vent shield. As originally formed the vent shield is in the form of an arc, as shown in Figs. 5, 6 and 7.

In order to apply the vent shield 15 to the cap 10 I employ an endless belt 18, actuated in the well known manner by a pair of pulleys, one of which is shown at 19. This belt passes over a table 20, at a suitable distance above which is placed the roll 21. The caps 10 are mounted on the shaft 22. The caps 10 are placed bottom side up on the belt 18, and the vent shield 15 is applied to each cap. The belt carries the caps successively beneath the roll 21, which flattens each vent shield so that instead of occupying the position shown in the caps at the right of the roll 21 in Fig. 6 the shield is forced into the position shown in the cap to the left of the roll. The table 20 serves to supply a firm support for the belt 18, and prevents sagging of the latter under pressure from the roll 21.

As most clearly shown in Fig. 5, when the vent shield is first applied to the cap 10 the tongues 17 occupy a position just inside of the U-shaped strip of solder 11, while, as shown in Fig. 4, after the vent shield has been flattened the tongues 17 are caught within the solder strip 11. When the cap 10 and its attached vent strip 15 are applied to a can 23, as shown in Fig. 1, it will be evident that the solder strip 12 may readily be melted in the well known manner in order to fasten the cap to the can, and subsequently the vent hole 13 is readily closed by a drop of solder, which is prevented from falling into the material within the can by means of the cup-shaped depression 16, which also serves to prevent said material from obtaining access to the vent hole, and thus interfering with the tipping process.

The vent shield being formed with the reduced portion 17, provides shoulders or points adapted to contact the can top and hold the shield steadily and without danger of turning from side to side during the operation of securing it to the cap. It will be noted that the metal surrounding the cup-shaped depression fits closely about the can cap when it is finally in place, and by this arrangement the contents of the can are prevented from getting into the solder-catching cup, while at the same time there is sufficient space between the shield and the cap to permit air to escape. It is to be observed that this space between the shield and the cap, as set forth above, is a capillary space so that any overflow of solder will be prevented from escaping by the capillary action.

It will be apparent to those skilled in the art that considerable change might be made in the exact form of cap and vent shield which I have described, and also in the method of applying the latter to the former, without departing from the spirit or scope of my invention.

What I claim is:

1. A can cap provided with a centrally-disposed downwardly-struck conical portion having a vent opening in its apex, and a vent shield secured to the under side of said cap and having a centrally-disposed cup-shaped portion of unbroken frusto-conical shape and disposed below the downwardly-struck portion in spaced relation to the vent opening, said shield portion entirely surrounding the downwardly-struck portion of the cap and being positioned with its peripheral edge close to said cap throughout.

2. A can cap provided with a vent opening, and a vent shield comprising a metal strip secured at its ends only to the under side of the cap and provided with an intermediate depressed cup portion lying beneath the vent opening with the periphery of the cup portion in spaced relation with the cap, thereby to exclude the passage of solder and permit the escape of air, steam and the like.

JESSE W. NICHOLS.

Witnesses:
  THOMAS J. KEOGH,
  HIRAM B. STRATTON.